UNITED STATES PATENT OFFICE.

CHARLES CRUM, OF HUDSON, NEW YORK.

IMPROVEMENT IN PROCESSES FOR MAKING BREAD.

Specification forming part of Letters Patent No. 12,479, dated March 6, 1855.

*To all whom it may concern:*

Be it known that I, CHARLES CRUM, of the city of Hudson, in the county of Columbia and State of New York, have discovered and invented a new and Improved Mode of Combining the Materials and of Making Bread; and I do hereby declare that the following is a full and exact description of the manner and mode of making bread which I have invented.

My invention consists in taking the dough, after being mixed and kneaded in the usual way for making bread, and keeping it in fermentation for six hours or more until it has reached the acetous state and become unfit for use in the ordinary process. I then take the dough in such acetous state, add to it one-fifth of its weight of dry fresh flour, and without any additional water mix and break it rapidly and very thoroughly through rollers, cut and pierce it in the cutting-machine, and after a slight fermentation—say thirty to forty minutes, according to the temperature of the room—in the open air bake it in a quick oven, which must be ventilated by an open door or other apparatus to admit and discharge the air freely. By this process I have succeeded in making a new and superior article of bread.

I use in making the dough about ninety-five pounds of water to two hundred pounds of flour, and from this weight make usually two hundred and eighty-two pounds of baked bread.

I claim the application of this invention to all kinds of flour of which bread is made, because the principle of my invention produces the same beneficial result in the use of any flour.

What I claim as my discovery and invention, and desire to secure by Letters Patent, is—

1. The suffering the dough to pass into the acetous state, then reviving it by the working and breaking into it fresh dry unfermented flour, and the subsequent process of cutting, piercing, raising in the open air, and baking in an open oven or an oven freely ventilated.

2. This invention in its application to wheat-flour or any other flour of which bread is made.

Witnesses:      CHARLES CRUM.
   I. W. FAIRFIELD,
   GEORGE B. FAIRFIELD.